United States Patent
Zhang et al.

(10) Patent No.: US 11,587,480 B2
(45) Date of Patent: Feb. 21, 2023

(54) DISPLAY SCREEN LIGHTER AND DISPLAY SCREEN DETECTION DEVICE

(71) Applicants: Ordos Yuansheng Optoelectronics Co., Ltd., Ordos (CN); BOE Technology Group Co., Ltd., Beijing (CN)

(72) Inventors: Jianping Zhang, Beijing (CN); Jing Zhang, Beijing (CN); Zhiqiang Wang, Beijing (CN)

(73) Assignees: Ordos Yuansheng Optoelectronics Co., Ltd., Ordos (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/463,399

(22) Filed: Aug. 31, 2021

(65) Prior Publication Data

US 2022/0130300 A1    Apr. 28, 2022

(30) Foreign Application Priority Data

Oct. 27, 2020 (CN) .......................... 202011164987.2

(51) Int. Cl.
 *G09G 3/00* (2006.01)
(52) U.S. Cl.
 CPC ......... *G09G 3/006* (2013.01); *G09G 2330/04* (2013.01); *G09G 2330/12* (2013.01)
(58) Field of Classification Search
 CPC ............... G09G 3/006; G09G 2330/04; G09G 2330/12; G09G 2330/06; H05K 9/0067
 See application file for complete search history.

(56) References Cited

U.S. PATENT DOCUMENTS

| | | | |
|---|---|---|---|
| 2008/0165301 A1 | 7/2008 | Chang et al. | |
| 2013/0273776 A1* | 10/2013 | Deng | H01R 31/065 439/620.01 |

(Continued)

FOREIGN PATENT DOCUMENTS

| | | |
|---|---|---|
| CN | 102629005 A | 8/2012 |
| CN | 105404035 A | 3/2016 |

(Continued)

OTHER PUBLICATIONS

CN 202011164987.2 first office action.

*Primary Examiner* — Mark W Regn
(74) *Attorney, Agent, or Firm* — IPro, PLLC

(57) ABSTRACT

A display screen lighter and a display screen detection device are provided. The display screen lighter comprises a mainboard, a switching board and an electrostatic discharge assembly, wherein the mainboard comprises a mainboard signal connecting port and is configured to generate a detection signal for electrically testing a display screen to be detected; the adapter plate comprises an adapter signal connecting port and is configured to transmit the detection signal to the display screen to be detected; the static charges releasing assembly comprises a signal transmission structure and a electrostatic discharge structure, the signal transmission structure is respectively and electrically connected with the mainboard signal connecting port and the display screen binding structure to form a plurality of signal channels, and the electrostatic discharge structure and the display screen to be detected are connected between the signal channels and the grounding terminal in parallel to discharge static charges in the display screen to be detected into the grounding terminal through the electrostatic discharge structure.

13 Claims, 4 Drawing Sheets

(56) References Cited

U.S. PATENT DOCUMENTS

2019/0197930 A1* 6/2019 Kim .................... G09G 3/3266
2021/0404983 A1   12/2021 Guo
2021/0410275 A1   12/2021 An et al.

FOREIGN PATENT DOCUMENTS

| CN | 105607769  | A  | 5/2016  |
| CN | 205812480  | U  | 12/2016 |
| CN | 108430153  | A  | 8/2018  |
| CN | 209328485  | U  | 8/2019  |
| CN | 110264926  | A  | 9/2019  |
| CN | 110702955  | A  | 1/2020  |
| WO | 2013155674 | A1 | 10/2013 |
| WO | 2019112329 | A1 | 6/2019  |

* cited by examiner

DISPLAY SCREEN LIGHTER AND DISPLAY SCREEN DETECTION DEVICE

CROSS-REFERENCE TO RELATED APPLICATIONS

This application claims priority to Chinese Patent Application No. 202011164987.2 filed in China on Oct. 27, 2020, the entire contents of which are incorporated herein by reference.

TECHNICAL FIELD

The present disclosure relates to an electrostatic discharge technical field, particularly, this disclosure relates to a display screen lighter and display screen detection device.

BACKGROUND

With the development of the times, the narrow frame design is deeply favored by users, and in consideration of the problem of wiring space, the thin film transistors in the gate driving circuits on two sides of the display screen are also changed from a double-gate structure in the display screen with a wider frame to a single-gate structure, but because the thin film transistors of the single-gate structure have poor antistatic capability, when the display screen is subjected to an electrical performance test (Cell ET), noise waves of detection signals and power supply selection can generate static charges, and when the voltage of the static charges is greater than the breakdown voltage of the display screen, the static charges can be transmitted to the display screen through the internal wiring of the lighting machine to the Pin, so that the thin film transistors and other elements in the display screen are damaged, and the defects are caused, and the yield of products is reduced.

SUMMARY

In a first aspect, a display screen lighter is provided, including:

a mainboard, including a mainboard signal connecting port and configured to generate a detection signal for electrically testing a display screen to be detected;

an adapter plate, including an adapter signal connecting port and configured to transmit the detection signal to the display screen to be detected; and an electrostatic discharge assembly, including a signal transmission structure and an electrostatic discharge structure, where the signal transmission structure is electrically connected with the mainboard signal connector and the display screen binding structure to form a plurality of signal channels, and the electrostatic discharge structure and the display screen to be detected are connected in parallel between the signal channels and a grounding terminal to discharge electrostatic charges in the display screen to be detected into the grounding terminal through the electrostatic discharge structure.

Optionally, the electrostatic discharge structure includes a bidirectional transient diode, one end of the bidirectional transient diode is electrically connected with the mainboard signal connecting port, and the other end of the bidirectional transient diode is grounded and electrically connected with the adapter signal connecting port.

Optionally, the signal transmission structure includes a first transmission structure and a second transmission structure;

the electrostatic discharge structure further includes a circuit bearing structure, the circuit bearing structure is provided with a grounding line to form the grounding terminal and provided with at least one first socket, the first socket is electrically connected to the mainboard signal connecting port through the first transmission structure, the circuit bearing structure is provided with at least one second socket, the second socket is electrically connected to the adapter signal connecting port through the second transmission structure, and the circuit bearing structure is provided with a plurality of metal lines, the metal line is electrically connected with the first socket and the second socket to form the signal channel with the first transmission structure and the second transmission structure.

Optionally, the first socket includes n first pins, the second socket includes n second pins, a number of the bidirectional transient diodes electrically connected with the first socket is n, the first end of each bidirectional transient diode is electrically connected with one of the first pins, the second end of each bidirectional transient diode is electrically connected with one of the second pins, n is an integer greater than or equal to 2, and each of the first pins is located in one signal channel;

the mainboard signal connection port includes n third pins, and the adapter signal connecting port includes n fourth pins;

the first transmission structure is a first flat cable, the second transmission structure is a second flat cable, the first flat cable includes n first connection points, n second connection points, and first signal wires which are respectively and electrically connected with the first connection points and the second connection points, and the second flat cable includes n third connection points, n fourth connection points, and second signal wires which are respectively and electrically connected with the third connection points and the fourth connection points;

each first connecting point is electrically connected with one of the third pins, each second connecting point is electrically connected with one of the first pins, each third connecting point is electrically connected with one of the second pins, and each fourth connecting point is electrically connected with one of the fourth pins.

Optionally, each of the bidirectional transient diodes is electrically connected to one of the signal channels, respective signal channel is configured to input a different signal, and the bidirectional transient diodes electrically connected to respective signal channels have different breakdown voltages.

Optionally, the breakdown voltage of the bidirectional transient diode is greater than an operating voltage of the corresponding electronic component in the display screen to be tested, and the breakdown voltage of the bidirectional transient diode is less than the breakdown voltage of the corresponding electronic component in the display screen to be tested.

Optionally, the grounding line includes a first grounding part extending along an arrangement direction of the first pin, a plurality of grounding points and a second grounding part electrically connected with the first connecting part and the grounding points, and the first socket and the second socket are distributed on different sides of the first grounding part;

the adjacent bidirectional transient diodes are located on different sides of the first grounded portion, and the ends of the adjacent bidirectional transient diodes, which are electrically connected with the first grounded portion, are different.

Optionally, the circuit bearing structure is further provided with a plurality of electrode pairs, each of the bidirectional transient diodes corresponds to one electrode pair, one end of each of the bidirectional transient diodes is electrically connected to one of the electrodes of the electrode pair, and the other end of each of the bidirectional transient diodes is electrically connected to the other electrode of the electrode pair;

each metal wire corresponds to one electrode pair, one electrode in each electrode pair is electrically connected with the first pin or the second pin, and the other electrode is electrically connected with the first pin or the second pin and is electrically connected with the first grounding part.

Optionally, the mainboard further includes a backlight connection port, the backlight connection port is electrically connected to a backlight source.

Optionally, the adapter plate is electrically connected to the display screen to be detected through a flexible circuit board, and the adapter plate is electrically connected to the flexible circuit board through a zero insertion force connector.

Optionally, the adapter plate is electrically connected to the display screen to be tested through a flexible circuit board, and the adapter plate is electrically connected to the flexible circuit board through a zero insertion force connector.

Optionally, the flexible circuit board includes a fifth connection point, a sixth connection point, and a connection line, the connection line is connected to the fifth connection point and the sixth connection point, where the fifth connection point is electrically connected to the fourth pin on the adapter plate, and the sixth connection point is electrically connected to the display screen binding structure on the display screen to be detected.

In a second aspect, a display screen detection device is provided, including a display screen lighter, where the display screen lighter includes:

a mainboard, including a mainboard signal connecting port and configured to generate a detection signal for electrically testing a display screen to be detected;

an adapter plate, including an adapter signal connecting port and configured to transmit the detection signal to the display screen to be detected; and an electrostatic discharge assembly, including a signal transmission structure and an electrostatic discharge structure, where the signal transmission structure is electrically connected with the mainboard signal connector and the display screen binding structure to form a plurality of signal channels, and the electrostatic discharge structure and the display screen to be detected are connected in parallel between the signal channels and a grounding terminal to discharge electrostatic charges in the display screen to be detected into the grounding terminal through the electrostatic discharge structure.

BRIEF DESCRIPTION OF THE DRAWINGS

The above and/or additional aspects and advantages of the present disclosure will become apparent and readily appreciated from the following description of the embodiments, taken in conjunction with the accompanying drawings of which.

DETAILED DESCRIPTION

Figure 1:
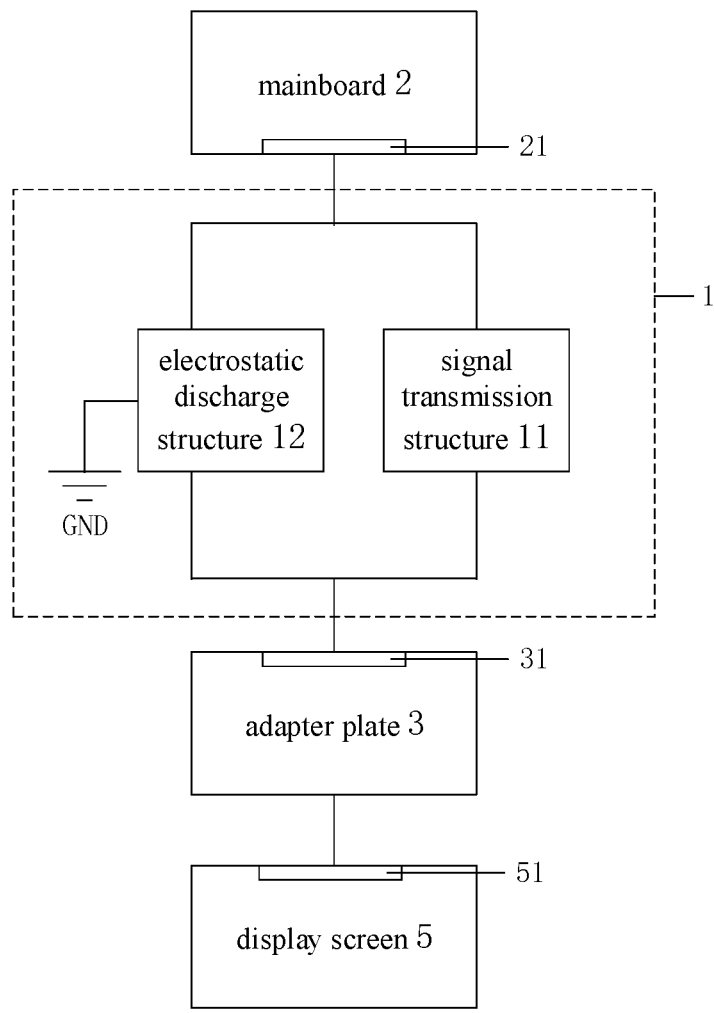
FIG. 1 is a schematic diagram of a frame structure of a display screen lighter according to an embodiment of the present disclosure.

Reference will now be made in detail to the present disclosure, examples of which are illustrated in the accompanying drawings, wherein like reference numerals refer to the same or similar elements or elements having the same or similar functions throughout. In addition, if a detailed description of known technologies is not necessary for illustrating the features of the present disclosure, it is omitted. The embodiments described below with reference to the accompanying drawings are illustrative only for the purpose of explaining the present disclosure, and are not to be construed as limiting the present disclosure.

It will be understood by those skilled in the art that, unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the singular forms "a", "an", "the" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The inventor of the present disclosure considers that, in order to save space in a display screen with a narrow bezel design, a thin film transistor in a gate driving circuit is also changed from a double-gate structure to a single-gate structure in a display screen with a wider bezel. However, because the thin film transistor with a single gate structure has poor antistatic capability, when the display screen is subjected to an electrical performance test (Cell ET), noise waves of detection signals and selection of a power supply can generate static charges, and when the voltage of the static charges is greater than the breakdown voltage of the display screen, the static charges is transmitted to the display screen through a Pin needle through internal wiring of a lighting machine, so that elements such as the thin film transistor in the display screen are damaged, and the defects are caused, and the yield of products is reduced.

The following describes the technical solutions of the present disclosure and how to solve the above technical problems in detail with specific embodiments.

Figure 2:
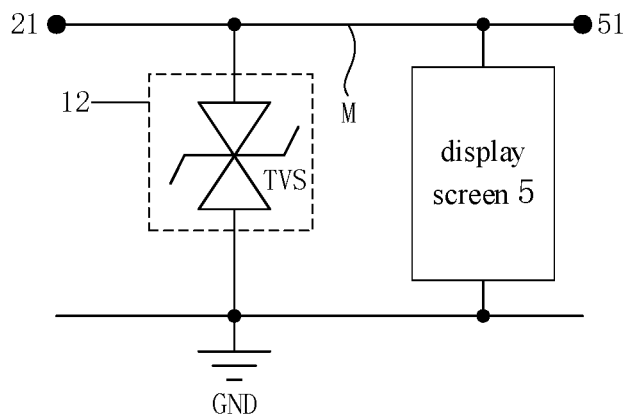
FIG. 2 is a schematic diagram of an analog circuit of an electrostatic discharge portion and a display screen to be tested according to an embodiment of the disclosure.

The embodiment of the present disclosure provides a display screen lighter, as shown in FIG. 1 and FIG. 2, the display screen lighter provided by the embodiment includes:

a mainboard 2 comprises a mainboard signal connection port 21 and is configured to generate a detection signal for electrically testing the display screen 5 to be detected;

an adapter plate 3 comprises an adapter signal connecting port 31 and is configured to transmit the detection signal to the display screen 5 to be detected;

the electrostatic discharge assembly 1 comprises a signal transmission structure 11 and an electrostatic discharge structure 12, wherein the signal transmission structure 11 is electrically connected with the mainboard signal connector 21 and the display screen binding structure 51 respectively to form a plurality of signal channels M, and the electrostatic discharge structure 12 and the display screen 5 to be detected are connected in parallel between the signal channels M and a ground terminal GND to discharge static charges in the display screen 5 to be detected into the ground terminal through the electrostatic discharge structure 12.

Specifically, the "display binding structure" referred to in this embodiment is a signal input end of the display 5 to be detected, and in this embodiment, the display binding structure 51 may be a bonding pad (pad).

Specifically, the "signal channel" in this embodiment refers to a signal transmission channel between the mainboard signal connection port 21 and the display screen binding structure 51, each signal channel M corresponds to a signal, and multiple signal channels M are in a parallel relationship.

The display screen lighter provided by the embodiment can release static charges of the display screen 5 to be detected, so that devices in the display screen 5 to be detected are prevented from being damaged by the static charges, and the purpose of protecting the display screen 5 to be detected is achieved; because the electrostatic discharge assembly 1 and the mainboard 2 and the adapter board 3 in the lighting machine are designed in a split type, the electrostatic discharge assembly 1 is easy to replace and the replacement cost is low even if the electrostatic discharge assembly 1 is damaged while the electrostatic discharge assembly is ensured to protect other structures.

Optionally, as shown in FIG. 2, in the display screen lighter provided in this embodiment, the electrostatic discharge structure 12 includes a bidirectional transient diode TVS, one end of the bidirectional transient diode TVS is electrically connected to the mainboard signal connection port 21 of the mainboard 2, and the other end of the bidirectional transient diode TVS is grounded and electrically connected to the adapter signal connection port. Specifically, the bidirectional transient diode TVS is formed by connecting two transient diodes in reverse parallel.

The transient diode is a high-efficiency protective device in a diode form, when two poles of the transient diode are impacted by reverse transient high energy, the high resistance between the two poles of the transient diode can be changed into low resistance at the speed of 10-12 seconds, the surge power up to thousands of watts can be absorbed, the voltage between the two poles of the transient diode is clamped at a preset value, precise components in an electronic circuit can be effectively protected, components in a display screen 5 to be detected are prevented from being damaged by various surge pulses, and the transient diode has the advantages of high response speed, large transient power, low leakage current, small breakdown voltage deviation, easiness in control of clamping voltage, no damage limit, small size and the like.

Figure 3:
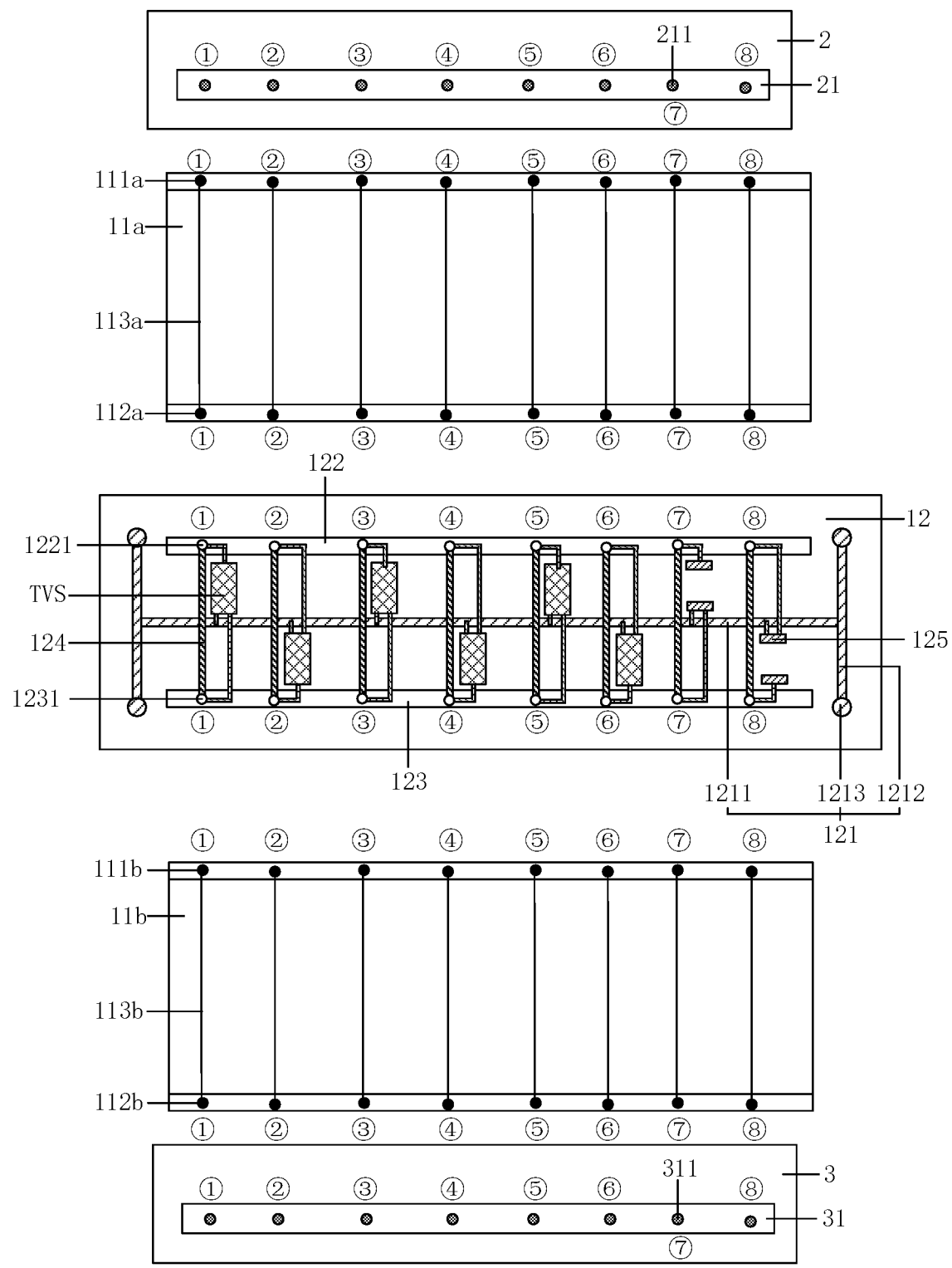
FIG. 3 is a schematic diagram of a split structure of a display screen lighter according to an embodiment of the disclosure.

Optionally, as shown in FIG. 3, in the display screen lighter provided in the present embodiment, the signal transmission structure 11 includes a first transmission structure 11a and a second transmission structure 11 b; the electrostatic discharge structure 12 further includes a circuit bearing structure, the circuit bearing structure is provided with a grounding line to form the grounding terminal 121 and provided with at least one first socket 122, the first socket 122 is electrically connected to the mainboard signal connecting port 21 through the first transmission structure 11a, the circuit bearing structure is provided with at least one second socket 123, the second socket 123 is electrically connected to the adapter signal connecting port through the second transmission structure 11b, and the circuit bearing structure is provided with a plurality of metal lines 124, the metal line 124 is electrically connected with the first socket 122 and the second socket 123 to form the signal channel with the first transmission structure 11a and the second transmission structure 11b.

Specifically, the electrostatic discharge structure 12 is a printed circuit board.

In particular, the number of first sockets 122 and second sockets 123 should be equal. Although the electrostatic discharge structure 12 shown in FIG. 3 includes only one first socket 122 and one second socket 123, the number of the first socket 122 and the second socket 123 may be plural, and, where permitted, the first socket 122 and the second socket 123 should be provided as many as possible, which not only can accommodate detection of more displays, but also can reserve a part of the first socket 122 and the second socket 123 as a spare socket so that normal detection of the display screen 5 to be detected can be performed using the spare socket when there is damage to the first socket 122 or the second socket 123, or the metal wire 124 between the first socket 122 and the second socket 123.

Specifically, as shown in FIG. 3, in the display screen lighter provided in the present embodiment, each first socket 122 corresponds to one first transmission structure 11a, and each second socket 123 corresponds to one second transmission structure 11 b.

In the embodiment, the ground wire 121, the first socket 122, the second socket and the metal wire 124 connected between the first socket 122 and the second socket 123 are arranged on the circuit bearing structure, and the bidirectional transient diode TVS is fixed on the circuit bearing structure, so that the metal wire 124 and the bidirectional transient diode TVS are connected in parallel, and since the metal wire 124 is connected in series with the signal transmission structure 11, the signal transmission structure 11 and the electrostatic discharge part 12 can be connected in parallel, and therefore, static charges entering the signal transmission structure 11 can be guided into the ground wire 121 by the electrostatic discharge part 12, and static charges entering the signal transmission structure 11 is discharged by the electrostatic discharge part 12, thereby achieving the purpose of protecting the display screen 5 to be detected.

Further, as shown in FIG. 3, in the display screen lighter provided in this embodiment, the first socket 122 includes n first pins 1221, the second socket 123 includes n second pins 1231, the number of the bidirectional transient diodes TVS electrically connected to the first socket 122 is n, the first end of each bidirectional transient diode TVS is electrically connected to one first pin 1221, the second end of each bidirectional transient diode TVS is electrically connected to one second pin 1231, where n is an integer greater than or equal to 2, and each first pin 1221 is located in one signal channel; the mainboard signal connector 21 includes n third pins 211, and the switching signal connector includes n fourth pins 311; the first transmission structure 11a is a first bus, the second transmission structure 11b is a second bus, the first bus includes n first connection points 111a, n second connection points 112a and a first signal line 113a electrically connected to the first connection point 111a and the second connection point 112a, respectively, and the second bus includes n third connection points 111b, n fourth connection points 112b and a second signal line 113b electrically connected to the third connection point 111b and the fourth connection point 112b, respectively; each of the first connection points 111a is electrically connected to one of the third pins 211, each of the second connection points 112a is electrically connected to one of the first pins 1221, each of the third connection points 111b is electrically connected to one of the second pins 1231, and each of the fourth connection points 112b is electrically connected to one of the fourth pins 311.

Figure 6:
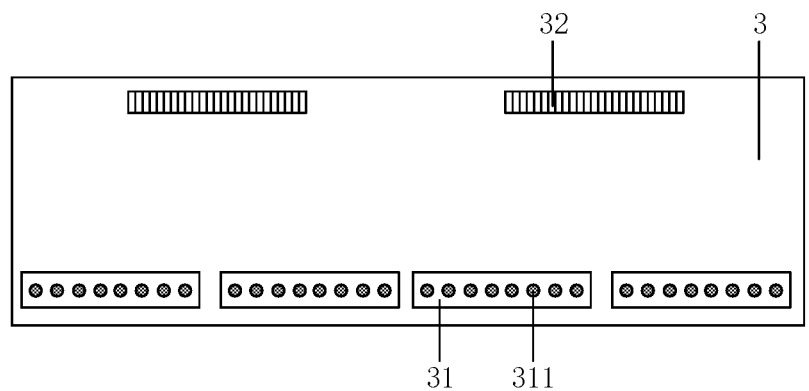
FIG. 6 is a schematic structural diagram of an adapter plate of a display screen lighter according to an embodiment of the present disclosure.

As shown in FIG. 3 and FIG. 6, in a specific embodiment, n is 8, and the third pin 211, the first connection point 111a, the second connection point 112a, the first pin 1221, the second pin 1231, the third connection point 111b, the fourth connection point 112b, and the fourth pin 311 which are numbered the same are sequentially connected until the display screen connector 32 of the adapter plate 3 is electrically connected to the display screen binding structure to form a multi-channel signal channel.

Further, as shown in FIG. 3, in the display screen lighter provided in this embodiment, each bidirectional transient diode TVS is electrically connected to only one signal channel M, the input signal of each signal channel M is different, and the breakdown voltage of the bidirectional transient diode TVS electrically connected to each signal channel is different.

The electrostatic discharge module 1 provided in this embodiment electrically connects the metal wire 124 for transmitting different signals to the bidirectional transient diode TVS with different breakdown voltages, so that the electrostatic discharge of each signal channel can be individually performed by selecting the adaptive bidirectional transient diode TVS according to the difference of the signals transmitted by each signal channel, thereby achieving a better electrostatic discharge effect.

Further, as shown in FIG. 3, in the display screen lighter provided in this embodiment, the breakdown voltage of the bidirectional transient diode TVS is greater than the operating voltage of the corresponding electronic component in the display screen 5 to be detected, and the breakdown voltage of the bidirectional transient diode TVS is less than the breakdown voltage of the corresponding electronic component in the display screen 5 to be detected. For example, one signal channel transmits an electrical signal of 5V, and a bidirectional transient transistor TVS with a breakdown voltage of 7V may be used, so that not only the lighting machine can normally detect the display screen 5 to be detected, but also static charges in the display screen 5 to be detected can be released in time.

Alternatively, as shown in FIG. 3, in the display screen lighter provided in the present embodiment, the ground line 121 includes a first ground portion 1211 extending along the arrangement direction of the first pin 1221, a plurality of ground points 1213, and a second ground portion 1212 electrically connected to the first connection portion and the ground points 1213, respectively, and the first socket 122 and the second socket 123 are distributed on different sides of the first ground portion 1211; the adjacent bidirectional transient diodes TVS are located at different sides of the first ground portion 1211, and ends of the adjacent bidirectional transient diodes TVS electrically connected to the first ground portion 1211 are different.

In the electrostatic discharge device 1 provided in this embodiment, the first grounding portion 1211 of the grounding line 121 is disposed between the first socket 122 and the second socket 123, and the adjacent bidirectional transient transistors TVS are disposed on two sides of the first grounding portion 1211, which is beneficial to reducing the area of the electrostatic discharge device 1.

Figure 4:
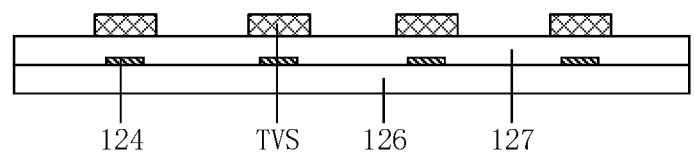
FIG. 4 is a schematic cross-sectional view of an electrostatic discharge portion provided by an embodiment of the present disclosure.

Specifically, as shown in FIG. 4, the printed circuit board includes a substrate layer 126, a metal layer on substrate layer 126, and an encapsulation layer 127 on a side of metal layer away from substrate layer 126, the metal layer including a plurality of metal lines 124 as described above, and the TVS tube is located on a side of encapsulation layer 127 away from the metal layer. Further, the orthographic projections of the bidirectional transient transistors TVS on the substrate layer 126 at least partially overlap, so that the area of the printed circuit board can be further reduced.

Optionally, as shown in FIG. 3, in the display screen lighter provided in this embodiment, the circuit bearing structure is further provided with a plurality of electrode pairs, each bidirectional transient diode TVS corresponds to one electrode, one end of each bidirectional transient diode TVS is electrically connected to one electrode 125 of the electrode pair, and the other end of each bidirectional transient diode TVS is electrically connected to the other electrode 125 of the electrode pair; each metal line 124 corresponds to one electrode pair, one electrode 125 of each electrode pair is electrically connected to the first lead 1221 or the second lead 1231, and the other electrode 125 is electrically connected to the first lead 1221 or the second lead 1231 and electrically connected to the first ground portion 1211.

Specifically, the electrode 125 may be a metal pad, for example, a metal pad made of copper, tin, or the like.

In this embodiment, the two ends of the bidirectional transient diode TVS are electrically connected to the first pin 1221, the second pin 1231 and the ground by providing the electrode 125 on the circuit bearing structure, so that the connection manner is simple, and after the bidirectional transient diode TVS is damaged, the electrostatic discharge structure 12 does not need to be replaced as a whole, but the damaged bidirectional transient diode TVS can be replaced easily and conveniently, and the replacement cost is lower.

Figure 5:
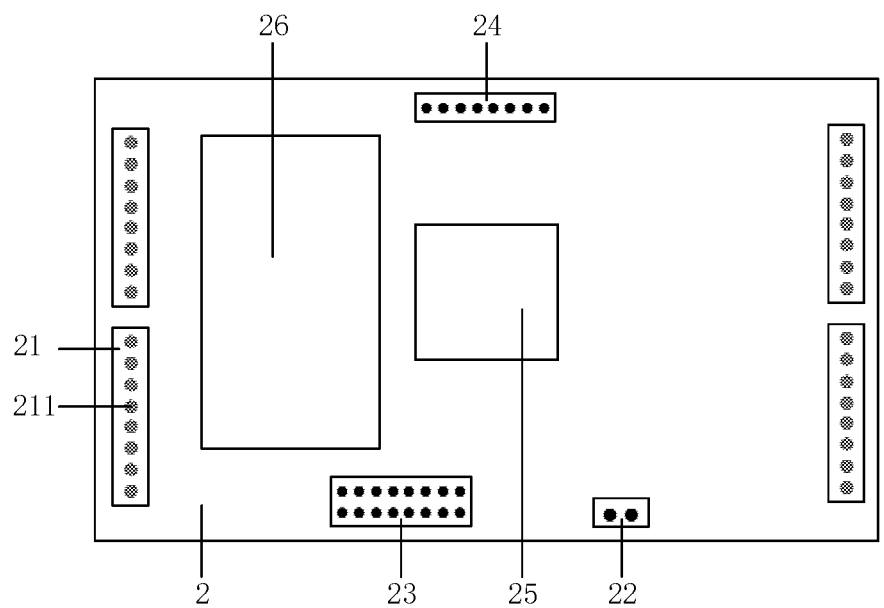
FIG. 5 is a schematic structural diagram of a mainboard of a display screen lighter according to an embodiment of the present disclosure.

Optionally, as shown in FIG. 5, in the display screen lighter provided in this embodiment, the mainboard 2 further includes a backlight connection port 22, and the backlight connection port 22 is electrically connected to the backlight source. Through setting up connector 22 in a poor light, can detect display screen 5 and change the backlight according to the model of difference to realize better detection effect.

Specifically, as shown in FIG. 5, in the display screen lighter of the present embodiment, the mainboard signal connector 21 includes a plurality of third pins 211, and the third pins 211 correspond to the first connection points 111a in the signal transmission structure 1111 one by one and are electrically connected, to achieve the electrical connection between the mainboard 2 and the electrostatic discharge module 1.

Specifically, as shown in FIG. 5, the device further includes a program burning interface 23, a power interface 24, a central processing unit 25, an electronic component 26, and the like, and the mainboard 2 provides a corresponding detection signal to the display screen 5 to be detected according to the program.

Figure 7:
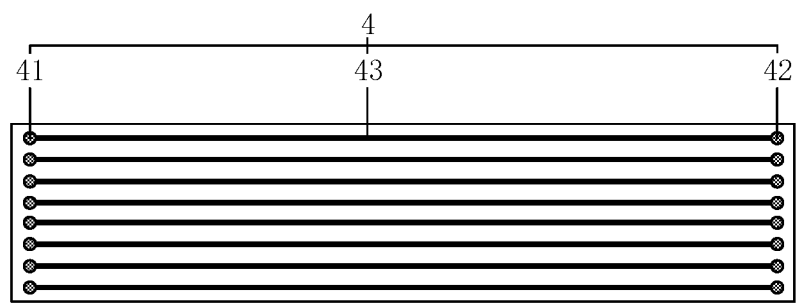
FIG. 7 is a schematic structural diagram of a flexible circuit board of a display screen lighter according to an embodiment of the present disclosure.

Alternatively, as shown in FIGS. 6 and 7, the present embodiment provides a display screen lighter in which the adapter plate 3 and the flexible circuit board 4 are electrically connected by a zero insertion force connector. The zero insertion force connector can be used for simply and conveniently realizing connection and detachment between the flexible circuit board and the adapter plate 3.

Alternatively, as shown in FIG. 3, FIG. 6 and FIG. 7, in the display screen lighter provided in this embodiment, the adapter plate 3 and the display screen 5 to be detected are electrically connected through the flexible circuit board 4. Adopt flexible line way board 4 to realize waiting to detect display screen 5 and keysets 3 electricity and be connected, be convenient for wait to detect display screen 5 according to the model of difference and change the flexible line way board to realize better detection effect.

Specifically, as shown in FIGS. 3, 6 and 7, the flexible circuit board 4 includes a fifth connection point 41, a sixth connection point 42 and a connection line 43, and the connection line 43 is connected between the fifth connection point 41 and the sixth connection point 42. The fifth connection point 41 is electrically connected to the fourth pin 311 on the adapter plate 3, and the sixth connection point 42 is electrically connected to the display screen binding structure 51 on the display screen 5 to be detected.

Figure 8:
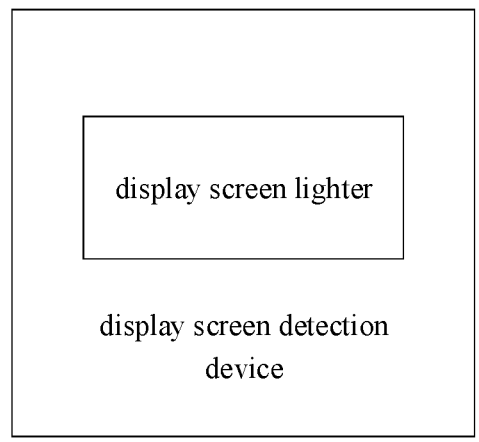
FIG. 8 is a schematic diagram of a frame structure of a display screen detection apparatus according to an embodiment of the present disclosure.

The embodiment of the present disclosure further provides a display screen detection device, as shown in FIG. 8, the display screen detection device provided in this embodiment includes the display screen lighter in the above embodiment, and has the beneficial effects of the display screen lighter in the above embodiment, which is not described herein again.

Specifically, the display screen detection apparatus provided by the present embodiment further includes a fixture for fixing the display screen 5 to be detected, an input device for operating the display screen lighter, and the like.

According to the embodiments of the present disclosure, the display screen lighter and the display screen detection device provided by the embodiment of the disclosure can release static charges of a display screen to be detected, so that devices in the display screen to be detected are prevented from being damaged by the static charges, and the purpose of protecting the display screen to be detected is achieved; because the static discharge assembly and the mainboard and the adapter plate in the lighting machine are in split design, the static discharge assembly is easy to replace and the replacement cost is low even if the static discharge assembly is damaged while the static discharge assembly is ensured to protect other structures.

Those of skill in the art will appreciate that the various operations, methods, steps, measures, schemes in the various operations, methods, flows that have been discussed in this disclosure may be alternated, modified, combined, or eliminated. Further, having various other steps, measures, or schemes in the operations, methods, or procedures that have been discussed in this disclosure may also be alternated, modified, rearranged, broken down, combined, or deleted. Further, steps, measures, schemes in various operations, methods, procedures disclosed in the related art and the present disclosure may also be alternated, changed, rearranged, decomposed, combined, or deleted.

In the description of the present disclosure, it is to be understood that the terms "center", "upper", "lower", "front", "rear", "left", "right", "vertical", "horizontal", "top", "bottom", "inner", "outer", and the like indicate orientations or positional relationships based on those shown in the drawings, merely for convenience in describing the present disclosure and simplifying the description, and do not indicate or imply that the device or element referred to must have a particular orientation, be constructed in a particular orientation, and be operated, and therefore, should not be construed as limiting the present disclosure.

The terms "first", "second" and "first" are used for descriptive purposes only and are not to be construed as indicating or implying relative importance or to implicitly indicate the number of technical features indicated. Thus, a feature defined as "first" or "second" may explicitly or implicitly include one or more of that feature. In the description of the present disclosure, the meaning of "a plurality" is two or more unless otherwise specified.

In the description of the present disclosure, it should be noted that, unless otherwise explicitly stated or limited, the terms "mounted," "connected," and "connected" are to be construed broadly, e.g., as being fixedly connected, detachably connected, or integrally connected; they may be connected directly or indirectly through intervening media, or they may be interconnected between two elements. The specific meaning of the above terms in the present disclosure can be understood in a specific case to those of ordinary skill in the art.

The particular features, structures, materials, or characteristics may be combined in any suitable manner in any one or more embodiments or examples.

It should be understood that, although the steps in the flowcharts of the figures are shown in order as indicated by the arrows, the steps are not necessarily performed in order as indicated by the arrows. The steps are not performed in the exact order shown and may be performed in other orders unless otherwise indicated herein. Moreover, at least a portion of the steps in the flow chart of the figure may include multiple sub-steps or multiple stages, which are not necessarily performed at the same time, but may be performed at different times, and the order of execution is not necessarily sequential, but may be performed alternately or alternately with other steps or at least a portion of the sub-steps or stages of other steps.

The foregoing is illustrative of only some embodiments of the disclosure, and it will be appreciated by those skilled in the art that various modifications and adaptations can be made without departing from the principles of the disclosure, and are intended to be within the scope of the disclosure.

What is claimed is:

1. A display screen lighter, comprising:
   a mainboard, comprising a mainboard signal connecting port and configured to generate a detection signal for electrically testing a display screen to be detected;
   an adapter plate, comprising an adapter signal connecting port and configured to transmit the detection signal to the display screen to be detected; and
   an electrostatic discharge assembly, comprising a signal transmission structure and an electrostatic discharge structure, wherein the signal transmission structure is electrically connected with the mainboard signal connector and the display screen binding structure to form a plurality of signal channels, and the electrostatic discharge structure and the display screen to be detected are connected in parallel between the signal channels and a grounding terminal to discharge electrostatic charges in the display screen to be detected into the grounding terminal through the electrostatic discharge structure.

2. The display screen lighter of claim 1, wherein the electrostatic discharge structure comprises a bidirectional transient diode, one end of the bidirectional transient diode is electrically connected with the mainboard signal connecting port, and the other end of the bidirectional transient diode is grounded and electrically connected with the adapter signal connecting port.

3. The display screen lighter of claim 2, wherein the signal transmission structure comprises a first transmission structure and a second transmission structure;

the electrostatic discharge structure further comprises a circuit bearing structure, the circuit bearing structure is provided with a grounding line to form the grounding terminal and provided with at least one first socket, the first socket is electrically connected to the mainboard signal connecting port through the first transmission structure, the circuit bearing structure is provided with at least one second socket, the second socket is electrically connected to the adapter signal connecting port through the second transmission structure, and the circuit bearing structure is provided with a plurality of metal lines, the metal line is electrically connected with the first socket and the second socket to form the signal channel with the first transmission structure and the second transmission structure.

4. The display screen lighter of claim 3, wherein the first socket comprises n first pins, the second socket comprises n second pins, a number of the bidirectional transient diodes electrically connected with the first socket is n, the first end of each bidirectional transient diode is electrically connected with one of the first pins, the second end of each bidirectional transient diode is electrically connected with one of the second pins, n is an integer greater than or equal to 2, and each of the first pins is located in one signal channel;

the mainboard signal connection port comprises n third pins, and the adapter signal connecting port comprises n fourth pins;

the first transmission structure is a first flat cable, the second transmission structure is a second flat cable, the first flat cable comprises n first connection points, n second connection points, and first signal wires which are respectively and electrically connected with the first connection points and the second connection points, and the second flat cable comprises n third connection points, n fourth connection points, and second signal wires which are respectively and electrically connected with the third connection points and the fourth connection points;

each first connecting point is electrically connected with one of the third pins, each second connecting point is electrically connected with one of the first pins, each third connecting point is electrically connected with one of the second pins, and each fourth connecting point is electrically connected with one of the fourth pins.

5. The display screen lighter of claim 4, wherein each of the bidirectional transient diodes is electrically connected to one of the signal channels, respective signal channel is configured to input a different signal, and the bidirectional transient diodes electrically connected to respective signal channels have different breakdown voltages.

6. The display screen lighter of claim 5, wherein the breakdown voltage of the bidirectional transient diode is greater than an operating voltage of the corresponding electronic component in the display screen to be tested, and the breakdown voltage of the bidirectional transient diode is less than the breakdown voltage of the corresponding electronic component in the display screen to be tested.

7. The display screen lighter of claim 4, wherein the grounding line comprises a first grounding part extending along an arrangement direction of the first pin, a plurality of grounding points and a second grounding part electrically connected with the first connecting part and the grounding points, and the first socket and the second socket are distributed on different sides of the first grounding part;

the adjacent bidirectional transient diodes are located on different sides of the first grounded portion, and the ends of the adjacent bidirectional transient diodes, which are electrically connected with the first grounded portion, are different.

8. The display screen lighter of claim 7, wherein the circuit bearing structure is further provided with a plurality of electrode pairs, each of the bidirectional transient diodes corresponds to one electrode pair, one end of each of the bidirectional transient diodes is electrically connected to one of the electrodes of the electrode pair, and the other end of each of the bidirectional transient diodes is electrically connected to the other electrode of the electrode pair;

each metal wire corresponds to one electrode pair, one electrode in each electrode pair is electrically connected with the first pin or the second pin, and the other electrode is electrically connected with the first pin or the second pin and is electrically connected with the first grounding part.

9. The display screen lighter of claim 4, wherein the adapter plate is electrically connected to the display screen to be tested through a flexible circuit board, and the adapter plate is electrically connected to the flexible circuit board through a zero insertion force connector.

10. The display screen lighter of claim 9, wherein the flexible circuit board includes a fifth connection point, a sixth connection point, and a connection line, the connection line is connected to the fifth connection point and the sixth connection point, wherein the fifth connection point is electrically connected to the fourth pin on the adapter plate, and the sixth connection point is electrically connected to the display screen binding structure on the display screen to be detected.

11. The display screen lighter of claim 1, wherein the mainboard further comprises a backlight connection port, the backlight connection port is electrically connected to a backlight source.

12. The display screen lighter of claim 1, wherein the adapter plate is electrically connected to the display screen to be detected through a flexible circuit board, and the adapter plate is electrically connected to the flexible circuit board through a zero insertion force connector.

13. A display screen detection device, comprising a display screen lighter, wherein the display screen lighter comprises:

a mainboard, comprising a mainboard signal connecting port and configured to generate a detection signal for electrically testing a display screen to be detected;

an adapter plate, comprising an adapter signal connecting port and configured to transmit the detection signal to the display screen to be detected; and an electrostatic discharge assembly, comprising a signal transmission structure and an electrostatic discharge structure, wherein the signal transmission structure is electrically connected with the mainboard signal connector and the display screen binding structure to form a plurality of signal channels, and the electrostatic discharge structure and the display screen to be detected are connected in parallel between the signal channels and a grounding terminal to discharge electrostatic charges in the display screen to be detected into the grounding terminal through the electrostatic discharge structure.

* * * * *